(12) United States Patent
Azuma (10) Patent No.: US 8,096,576 B2
(45) Date of Patent: Jan. 17, 2012

(54) HOUSING FIXING STRUCTURE

(75) Inventor: Tomoyo Azuma, Kobe (JP)

(73) Assignee: Fujitsu Ten Limited, Kobe-Shi (JP)

( * ) Notice: Subject to any disclaimer, the term of this patent is extended or adjusted under 35 U.S.C. 154(b) by 15 days.

(21) Appl. No.: 12/570,561

(22) Filed: Sep. 30, 2009

(65) Prior Publication Data

US 2010/0078918 A1    Apr. 1, 2010

(30) Foreign Application Priority Data

Sep. 30, 2008  (JP) .................................. 2008-255751

(51) Int. Cl.
*H05K 5/00*         (2006.01)
(52) U.S. Cl. ..................... 280/728.2; 361/752; 361/730; 280/735
(58) Field of Classification Search ............... 280/728.2, 280/734, 735; 180/721; 220/4.02; 116/203; 361/752, 736, 679.02, 730, 759; 174/535, 174/541; 439/483, 620.21, 74, 76.1, 34, 439/67
See application file for complete search history.

(56) References Cited

U.S. PATENT DOCUMENTS

| | | | | |
|---|---|---|---|---|
| 4,409,641 A | * | 10/1983 | Jakob et al. | ..................... 361/720 |
| 5,118,903 A | * | 6/1992 | Schupp et al. | ................ 174/16.3 |
| 6,302,190 B1 | * | 10/2001 | Clamp et al. | .................. 165/80.4 |
| 6,364,144 B1 | | 4/2002 | Jakob et al. | |
| 6,669,505 B2 | * | 12/2003 | Wisniewski | .................. 439/521 |
| 6,781,847 B2 | * | 8/2004 | Jakob et al. | .................... 361/752 |

FOREIGN PATENT DOCUMENTS

| | | |
|---|---|---|
| JP | U-6-972 | 1/1994 |
| JP | A-7-196008 | 8/1995 |
| JP | A-8-40185 | 2/1996 |
| JP | A-9-159689 | 6/1997 |
| JP | A-9-207706 | 8/1997 |
| JP | A-2000-517474 | 12/2000 |
| JP | A-2003-335180 | 11/2003 |
| JP | A-2005-155827 | 6/2005 |

OTHER PUBLICATIONS

Akiyama et al. JP 09-207706 English translation claims and detailed description Dec. 8, 2007.*

* cited by examiner

*Primary Examiner* — Faye M Fleming
*Assistant Examiner* — Karen A Beck
(74) *Attorney, Agent, or Firm* — Oliff & Berridge, PLC (57) ABSTRACT

A housing fixing structure for fixing a hosing of an airbag control device to a supporting portion of a vehicle is provided. The airbag control device is provided with an impact detection device and configured to control an airbag based on information detected by the impact detection device. The housing includes a main body which accommodates the impact detection device and three fixing portions which are configured to be fixed to the supporting portion. The housing is provided with a contact portion which is configured to come into contact with the support portion. The contact portion is disposed within a triangular region which is defined by lines connecting center points of the fixing portions.

12 Claims, 7 Drawing Sheets

HOUSING FIXING STRUCTURE

The disclosure of Japanese Patent Application No. 2008-255751 filed on Sep. 30, 2008 including specification, drawings and claims is incorporated herein by reference in its entirety.

BACKGROUND

The present invention relates to a housing fixing structure, in particular, to a housing fixing structure for fixing a housing of an electronic control device which performs a safety control based on a signal of an impact detection sensor.

Figure 1:
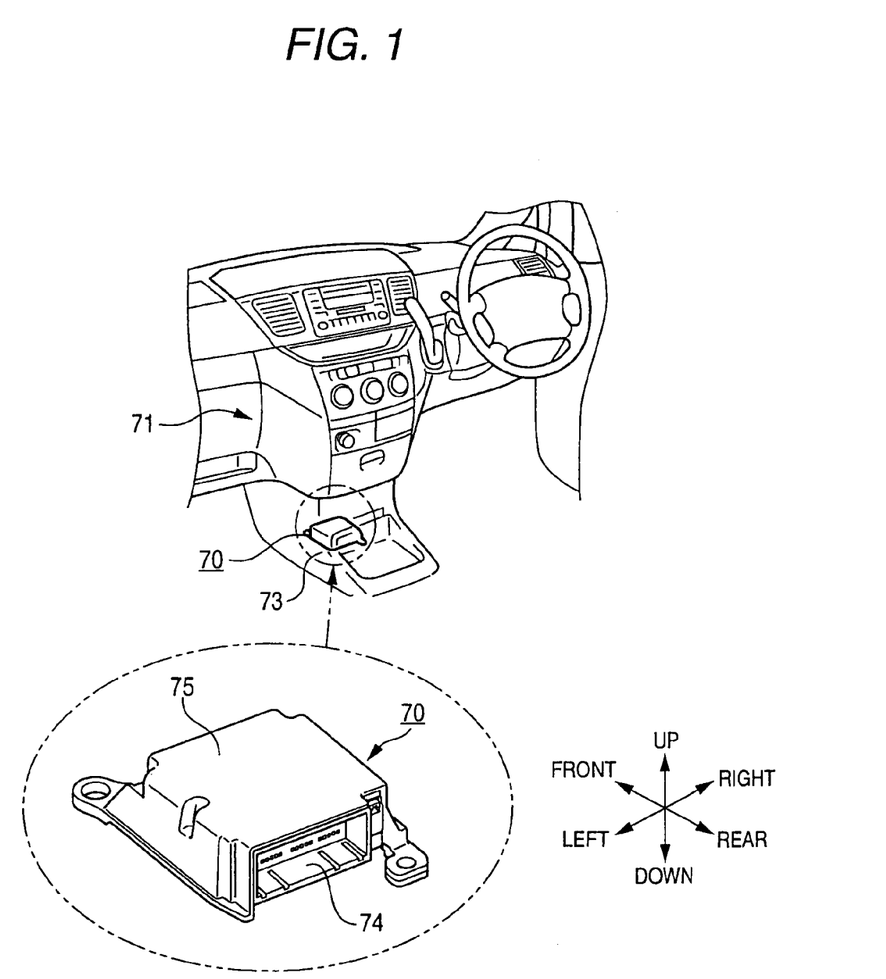
FIG. 1 is a schematic view illustrating an attachment position of an airbag ECU 70 according to a related-art.
Figure 2:
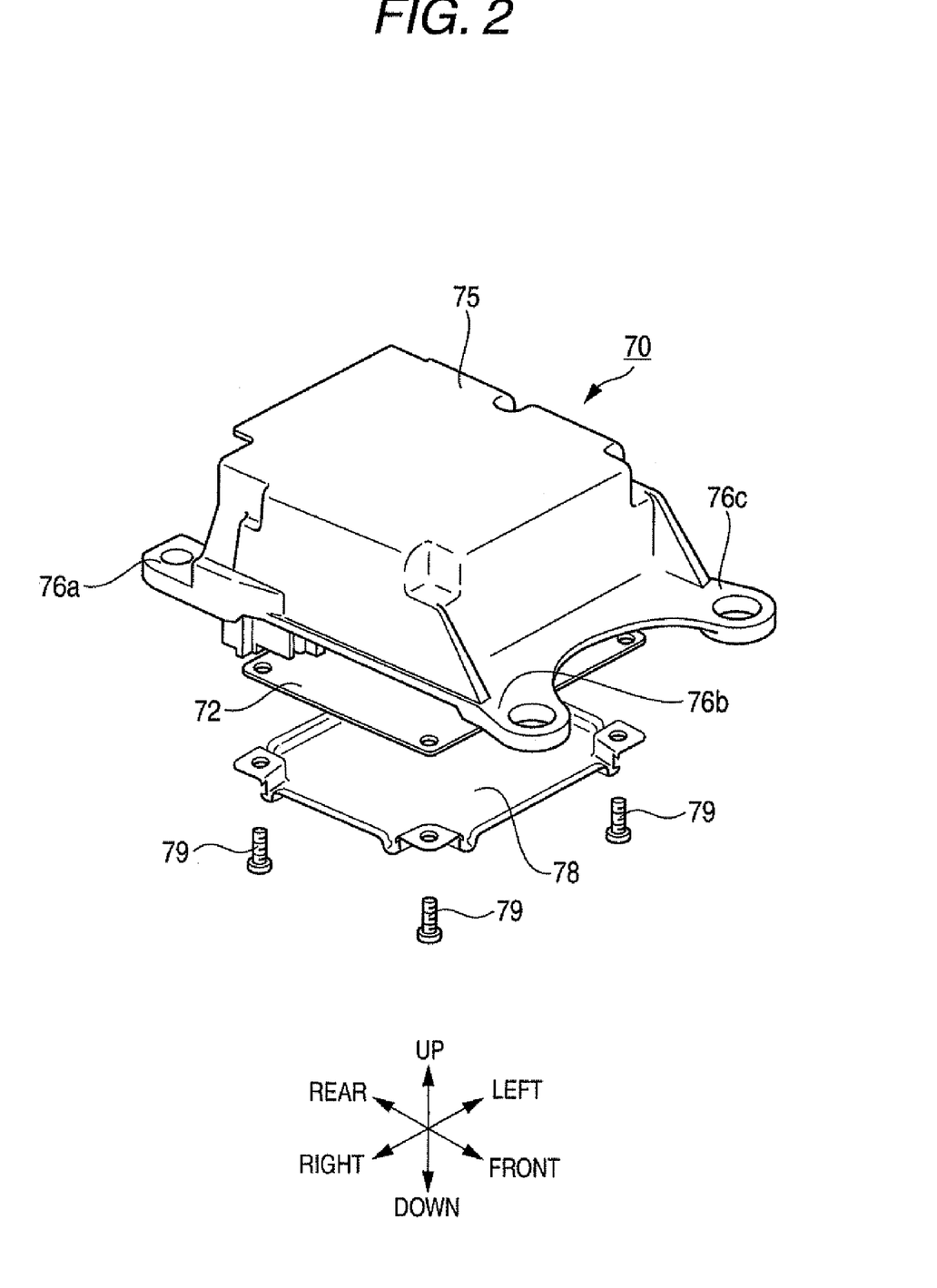
FIG. 2 is a perspective view of the constituent components of the airbag ECU 70 when viewed obliquely from the front and right side according to the related-art.
Figure 3:
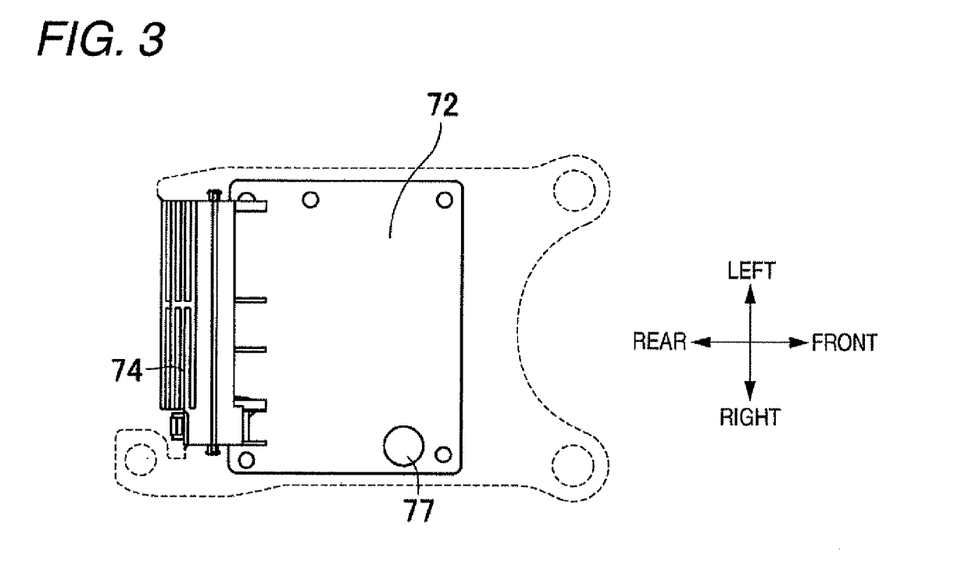
FIG. 3 is a schematic view illustrating a board 72 when viewed from directly above according to the related-art.

FIG. 1 is a schematic view illustrating an attachment position of an airbag electronic control device (hereinafter, referred to as "airbag ECU") 70 according to a related art. FIG. 2 is a perspective view of the constituent components of the airbag ECU 70 when viewed obliquely from the front and right side. As indicated by arrows in FIG. 1, hereinafter, the front-back direction, the left-right direction, and the up-down direction are defined with reference to a vehicle on which the airbag ECU 70 is to be mounted. That is, the front-back direction is the longitudinal direction of the vehicle, the left-right direction is the width direction of the vehicle, and the up-down direction is the height direction of the vehicle. FIG. 3 is a schematic view illustrating a board 72 when viewed from directly above according to a related art.

A support surface 73 supporting the airbag ECU 70 is disposed below an instrument panel 71 provided at the front central portion inside the vehicle. The airbag ECU 70 is screwed to the support surface 73 at three points to be fixed to the vehicle. A connector 74 is provided at the rear portion of the airbag ECU 70, and a connection portion of the connector 74 is provided at an opening formed at the rear side surface of a housing 75. An attachment bracket 76a for fixing the airbag ECU 70 to the support surface 73 of the vehicle is provided at the right side of the rear portion of the airbag ECU 70. Attachment brackets 76b and 76c for fixing the airbag ECU 70 to the vehicle are respectively provided at the left and right sides of the front portion of the airbag ECU 70. No attachment bracket is provided at the left side of the connection portion of the connector 74 (at the left side of the rear portion of the airbag ECU 70).

As shown in FIG. 3, an acceleration sensor 77 for detecting an impact of a vehicle collision and the connector 74 are mounted on the board 72. As shown in FIG. 2, the board 72 on which the acceleration sensor 77 and the connector 74 are mounted is screwed to the housing 75 from below the housing 75 together with a cover 78 provided below the board 72.

Figure 4:
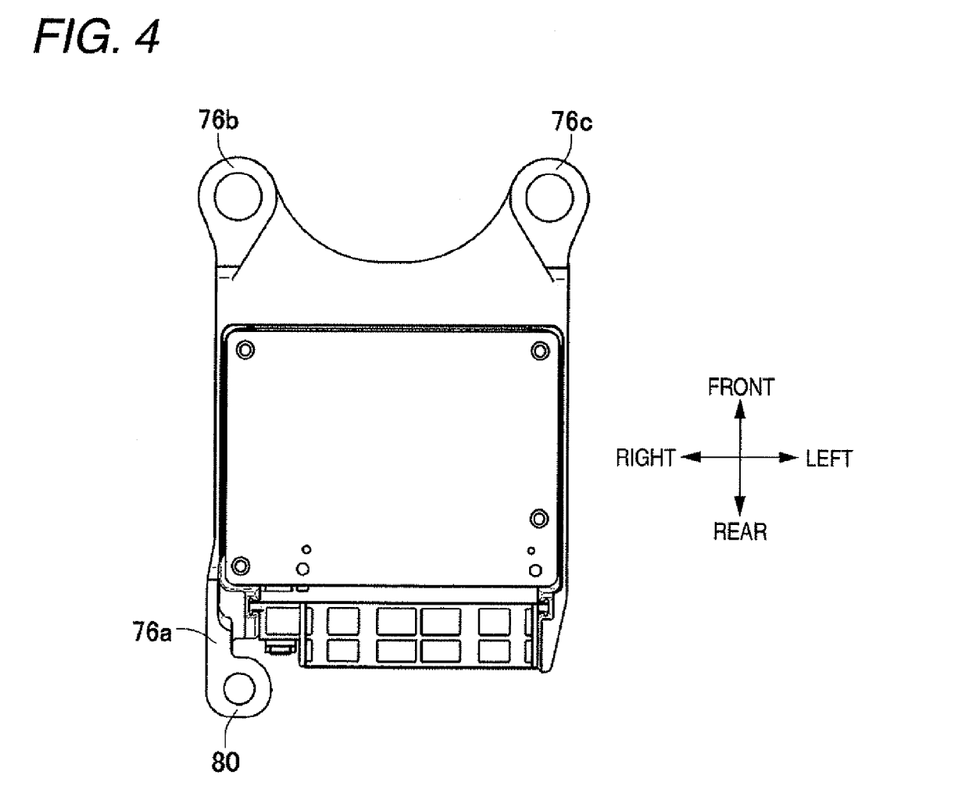
FIG. 4 is a schematic view illustrating the airbag ECU 70 when viewed from below according to the related-art.
Figure 5:
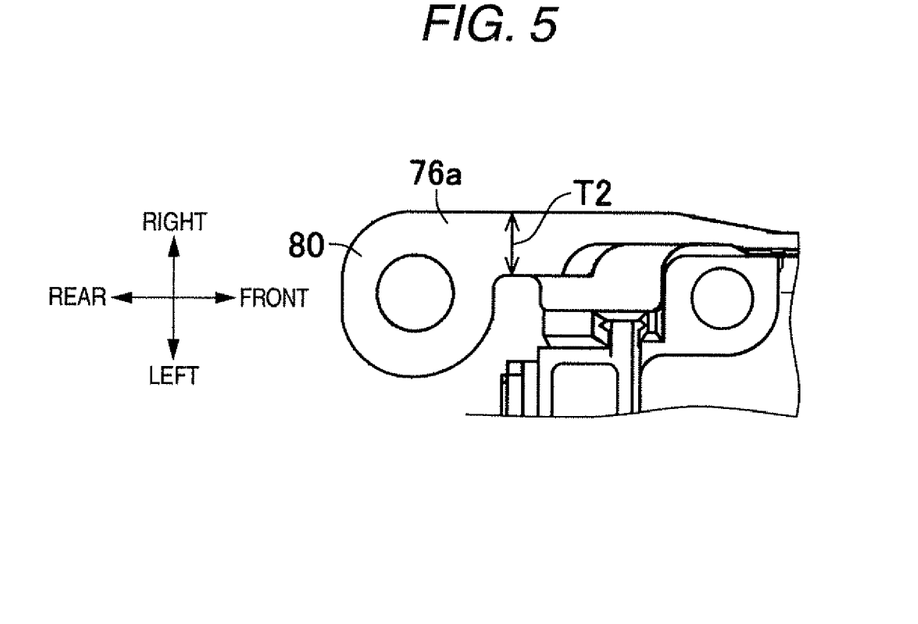
FIG. 5 is an enlarged view illustrating an attachment bracket 76a disposed at the rear right side of a connector 74 when viewed from below according to the related-art.

FIG. 4 is a schematic view illustrating the airbag ECU 70 according to the related art when viewed from below. FIG. 5 is an enlarged view illustrating the attachment bracket 76a disposed at the rear right side of the connector 74 when viewed from below. The impact applied to the vehicle is transferred to the attachment brackets 76a, 76b, and 76c of the housing 75 and then transferred from the attachment brackets 76a, 76b, and 76c to the board attachment screw bearing surfaces (not shown) of the housing 75. The impact transferred to the board attachment screw bearing surfaces is transferred to the board 72 via board attachment screws 79. The acceleration sensor 77 mounted on the board 72 detects the impact transferred to the board 72 and then outputs a detection signal to the airbag ECU 70. The airbag ECU 70 outputs an ignition signal for deploying the airbag when it is determined that the degree of the impact of the vehicle collision exceeds a predetermined threshold value based on the detection signal.

When excessive impact is applied to the vehicle due to the vehicle collision, the attachment bracket 76a disposed at the rear portion of the housing 75 so as to fix the airbag ECU 70 to the support surface 73 is broken, in order to prevent the board 72 from being deformed or broken. With the attachment bracket 76a being broken, the impact transferred from the vehicle to the board 72 is reduced. Accordingly, when the excessive impact is applied to the vehicle, the attachment bracket 76a has to be broken. In addition, the bracket portion needs to be further reduced in weight. Therefore, the attachment bracket 76a is molded such that the width T2 of a connecting portion connecting a fixing portion 80 of the attachment bracket 76a and the housing main body is narrow within the range without causing any problem involving strength.

Patent Document 1 discloses a housing structure in which an impact transferred to a housing is well transferred to a board accommodated in the housing, and deformation of the board can be suppressed on the basis of distortion in the housing. Patent Document 2 discloses a configuration in which a short protrusion is formed in order to protect a casing from an impact due to falling when the casing falls down. The protrusion is made of the same material as the casing and can be formed integrally with the casing. Patent Document 3 discloses a configuration in which vibration from a single printed board on which a processing circuit is mounted is unlikely to be transferred to an acceleration sensor even if the acceleration sensor and constituent components of the processing circuit are mounted on the single printed board.

Patent Document 4 discloses a configuration in which a sensor is fixed to a casing to prevent motions other than motions in the casing from being transferred to the sensor in order to prevent vibration in the up-down direction of a vehicle from being erroneously detected as vibration in the longitudinal direction of the vehicle when the sensor assembly is mounted on the vehicle.

Patent Document 5 discloses a configuration in which a casing of a collision detection device is composed of a cover and a housing which are fitted with each other in order to prevent the collision detection device from being easily disassembled.

Patent Document 6 discloses a collision detection device in which an acceleration sensor and a microcomputer determining collision are provided in a unit case, such that vibration of the unit case and constituent components is unlikely to be transferred to the acceleration sensor.

Patent Document 1: JP-A-2005-155827
Patent Document 2: JP-T-2000-517474
Patent Document 3: JP-A-9-207706
Patent Document 4: JP-A-9-159689
Patent Document 5: JP-A-8-40185
Patent Document 6: JP-A-7-196008

Figure 6:
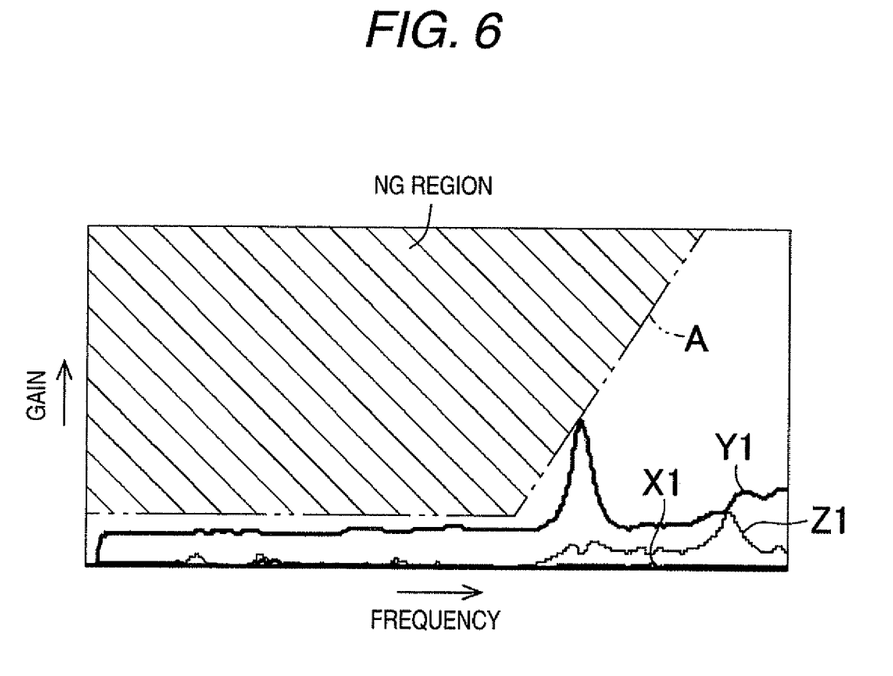
FIG. 6 is a graph illustrating a measurement result of the resonance characteristics of the airbag ECU 70 in a low frequency region according to the related art.

FIG. 6 is a graph illustrating a measurement result of the resonance characteristics of the airbag ECU 70 according to the related art in a low frequency region. Vibration is applied to the airbag ECU 70 in the front-back direction, the left-right direction, and the up-down direction of the vehicle, and the resonance generated in the respective directions are measured. X1 represents the resonance in the front-back direction (the traveling direction) of the vehicle, Y1 represents the resonance in the left-right direction of the vehicle, and Z1 represents the resonance in the up-down direction of the vehicle. A dashed-two dotted line A represents boundary of an NG region where it is determined that the vehicle collision occurs. According to the resonance characteristics shown in FIG. 6, the resonance in the left-right direction overlapping the line A is generated. When the resonance which enters the NG region is generated, the acceleration sensor 77 may detect an impact which should not be detected. Although the connector 74 is the heaviest component mounted on the board 72, the connector 74 is not securely fixed to the vehicle since no attachment bracket is provided at the left rear side of the connector 74. That is, there is a lot of flexibility at the left rear side of the connector 74. When the left side of the connector 74 swings greatly, the resonance which enters the NG region is generated. However, the Patent Documents 1 to 6 fails to describe a configuration in which the resonance of the board in the low frequency region can be effectively suppressed.

SUMMARY

It is therefore an object of at least one embodiment of the present invention to provide a housing fixing structure for fixing a housing of an electronic control device which performs a safety control based on a signal of an impact detection sensor.

In order to achieve the above described object, according to a first aspect of at least one embodiment of the present invention, there is provided a housing fixing structure for fixing a hosing of an airbag control device to a supporting portion of a vehicle, the airbag control device provided with an impact detection device and configured to control an airbag based on information detected by the impact detection device, wherein the housing includes a main body which accommodates the impact detection device and three fixing portions which are configured to be fixed to the supporting portion, wherein the housing is provided with a contact portion which is configured to come into contact with the support portion, and wherein the contact portion is disposed within a triangular region which is defined by lines connecting center points of the fixing portions. The fixing portions may include a first fixing portion, a second fixing portion and a third fixing portion, the first fixing portion and the second fixing portion may be disposed such that a center point of the first fixing portion and a center point of the second fixing portion are arranged on a line in a longitudinal direction of the vehicle, and the first fixing portion and the third fixing portion may be disposed such that the center point of the first fixing portion and a center point of the third fixing portion are arranged on a line in a width direction of the vehicle. The contact portion may be disposed in a vicinity of the center point of the second fixing portion. The housing may further include a connecting portion which connects the second fixing portion to the main body, and the contact portion may be formed in the connecting portion. The main body may further include an accommodating portion which accommodates a board on which a connector for connecting the impact detection device to an external electronic component is mounted. The main body may further include a connector cover portion which covers the connector, and the contact portion may be formed in the connector cover portion. The connector may be disposed at a front side or a rear side of the housing in a longitudinal direction of the vehicle. The main body may have a substantially quadrangular shape and the fixing portions may be respectively disposed at three corners of the quadrangular shape. The contact portion may be formed in one of the fixing portions.

According to a second aspect of at least one embodiment of the present invention, there is also provided a housing fixing structure for fixing a hosing of a control device to a supporting portion of a vehicle, the control device provided with an impact detection device and configured to perform a predetermined control based on information detected by the impact detection device, wherein the housing includes a main body which accommodates the impact detection device and at least three fixing portions which are configured to be fixed to the supporting portion, wherein a portion of the housing is protruded within a polygonal region which is defined by lines connecting center points of the fixing portions, and wherein a contact portion which is configured to come into contact with the support portion is formed in the vicinity of the protruded portion of the housing.

According to the first and second aspects of the invention, it is possible to perform a safety control based on a signal of a sensor for detecting an impact.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE EMBODIMENTS

Figure 7:
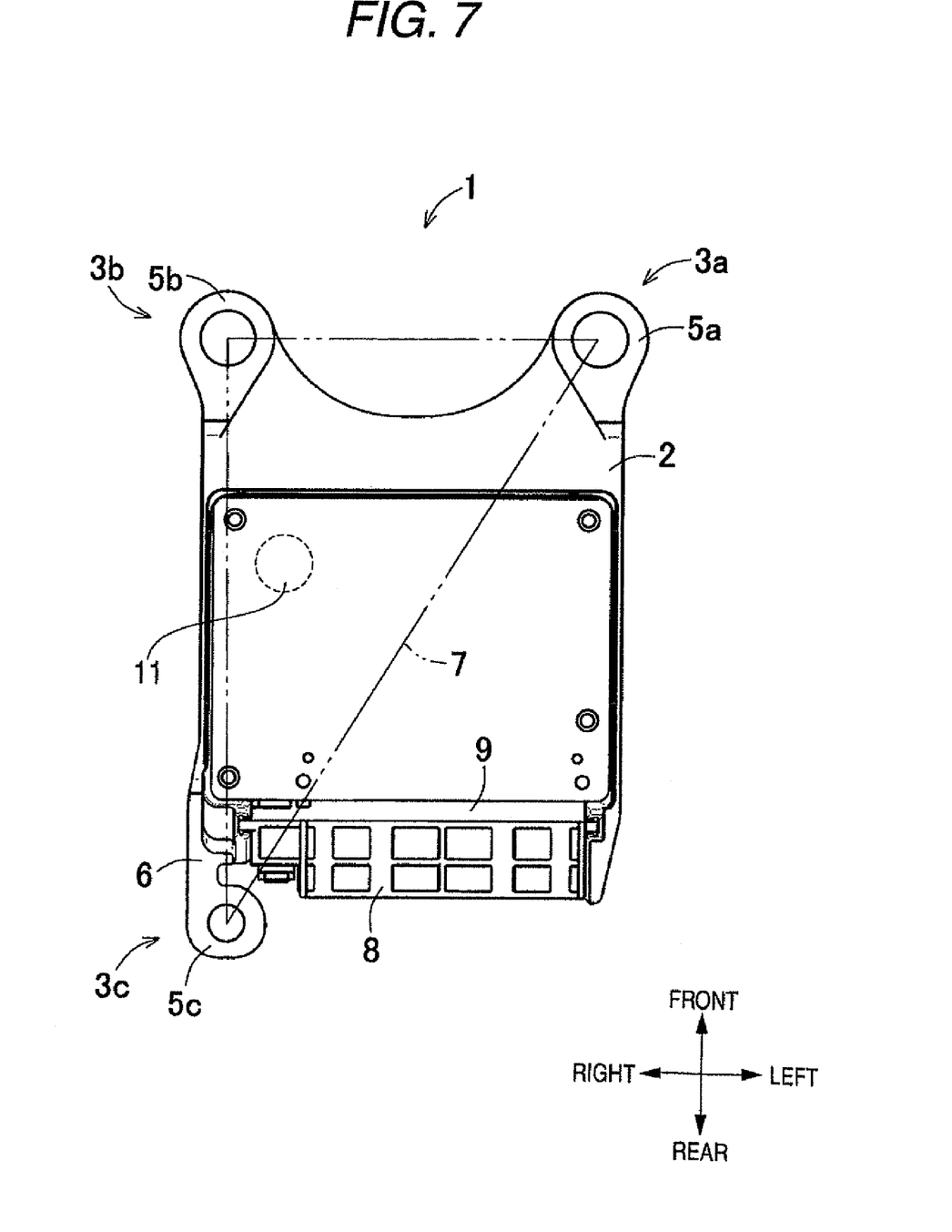
FIG. 7 is a schematic view illustrating an airbag ECU 1 when viewed from below according to an embodiment of the present invention.

FIG. 7 is a schematic view illustrating an airbag ECU 1 when viewed from below according to an embodiment of the present invention. Hereinafter, the front-back direction, the left-right direction, and the up-down direction are defined with reference to a vehicle on which the airbag ECU 1 is to be mounted. That is, the front-back direction is the longitudinal direction of the vehicle, the left-right direction is the width direction of the vehicle, and the up-down direction is the height direction of the vehicle. A board 9 on which an acceleration sensor 11 serving as a vehicle collision/impact detection unit and a connector 8 are mounted is screwed at four points to an accommodating portion provided at lower side of a housing 2 together with a cover 7 provided below the board 9. The acceleration sensor 11 is mounted on the front right side of the board 9. The connector 8 is mounted at the rear portion of the board 9. When the board 9 on which the connector 8 is mounted is attached to the housing 2, the connector 8 is disposed at the rear portion of the housing 2.

An impact applied to the vehicle is transferred to the board 9 provided in the airbag ECU 1. The acceleration sensor 11 mounted on the board 9 detects the impact transferred to the board 9. A detection signal of the acceleration sensor 11 is output to the airbag ECU 1. The connector 8 connects the acceleration sensor 11 and an external electronic component via a connection terminal. A connection portion of the connector 8 is provided at the rear side surface of the housing 2.

The airbag ECU 1 is fixed to the vehicle by three attachment brackets 3a, 3b, 3c provided in the housing 2. Attachment brackets 3a and 3b are respectively provided at the left and right sides of the front portion of the housing main body, and only one attachment bracket 3c is provided at the right side of the rear portion of the housing main body. That is, the housing main body is formed into a substantially quadrangular shape and the attachment brackets 3a, 3b, 3c are respectively disposed at three corners of the quadrangular shape of the housing main body. A fixing portion 5b of the attachment bracket 3b and a fixing portion 5c of the attachment bracket 3e are disposed such that the fixing portions 5b and 5c are arranged on a line in the longitudinal direction of the vehicle. A fixing portion 5a of the attachment bracket 3a and the fixing portion 5b of the attachment bracket 3b are disposed such that the fixing portions 5a and 5b are arranged on a line in the width direction of the vehicle.

The fixing direction of the airbag ECU 1 to the vehicle is not limited to the above. For example, the airbag ECU 1 may be attached in an opposite manner in the longitudinal direction of the vehicle. That is, the airbag ECU 1 may be fixed such that the lower side of FIG. 7 turns toward the front side of the vehicle. In this case, the connector 8 is disposed at the front portion of the housing 2, and the acceleration sensor 11 is disposed at the rear portion of the housing.

Figure 8A:
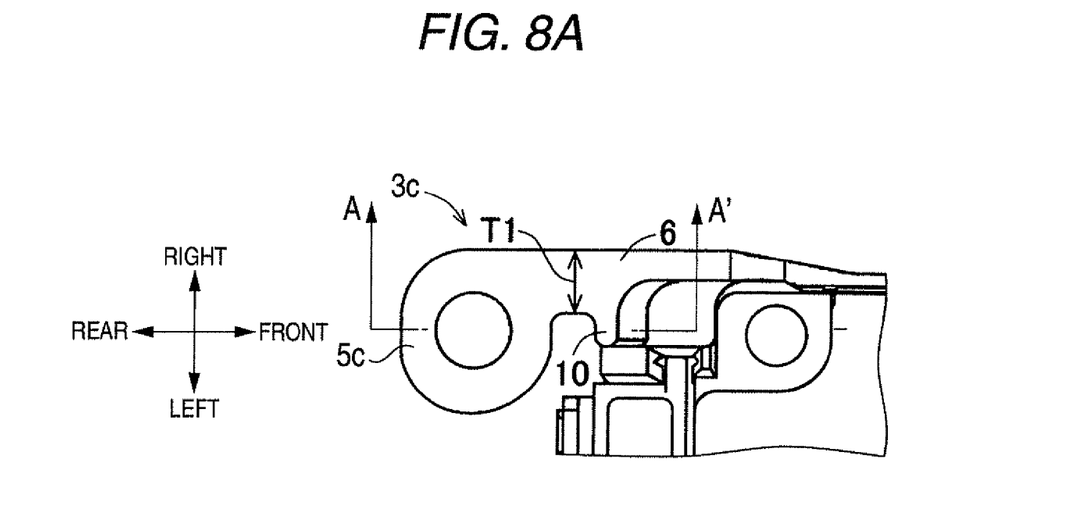
FIG. 8A is an enlarged view illustrating an attachment bracket 3c disposed at the rear right side of a connector 8 when viewed from below according to the embodiment.

FIG. 8A is an enlarged view illustrating an attachment bracket 3c disposed at the rear right side of a connector 8 when viewed from below according to the embodiment. The attachment bracket 3c has the fixing portion 5c for screwing the airbag ECU 1 to the vehicle with a screw 12, and a connection portion 6 connecting the fixing portion 5c and the housing main body. When the impact is applied to the vehicle due to a vehicle collision, in order to prevent the acceleration sensor 11 mounted on the board 9 from being broken, the connection portion 6 provided at the rear portion of the housing is broken. With the attachment bracket 3c being broken, the impact transferred to the board 9 is reduced. Accordingly, the attachment bracket 3c is molded such that the width T1 of the connection portion 6 is narrow within the range without causing any problem involving strength, and thus the connection portion 6 is broken when the impact is applied to the vehicle due to the vehicle collision.

Although the connector 8 is the heaviest component mounted on the board 9, only the attachment bracket 3c disposed at the rear right side of the connector 8 is provided as an attachment bracket in the vicinity of the connector 8. The connection portion 6 of the attachment bracket 3c is molded in consideration of being broken, and the connector portion of the connector 8 has a large degree of freedom since no attachment bracket is provided on the rear left side of the connector 8. Accordingly, the connector portion is likely to swing greatly, and then resonance is likely to be generated.

Figure 8B:
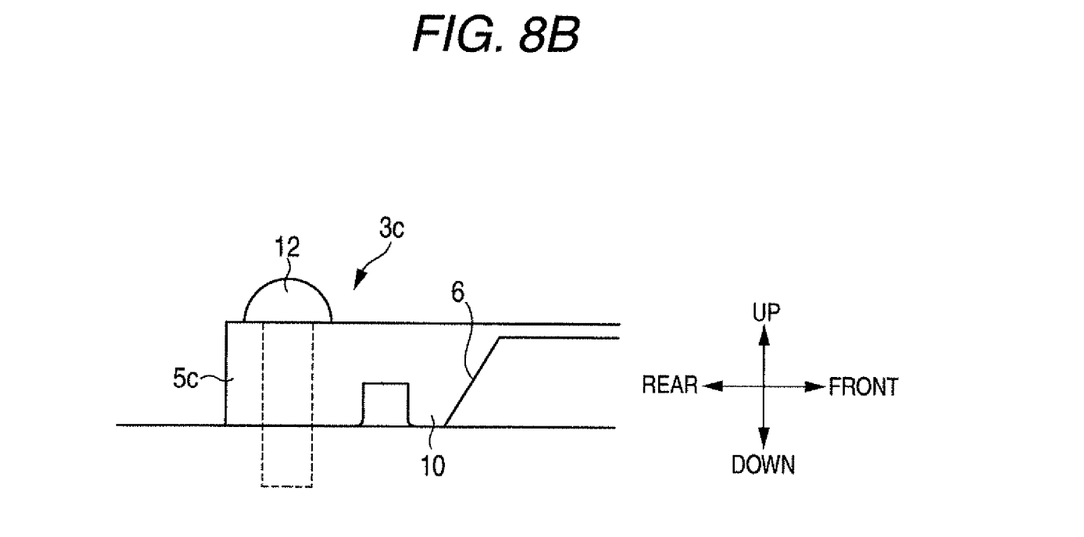
FIG. 8B is a sectional view taken along the line A-A' in FIG. 8A.

FIG. 8B is an enlarged view illustrating the attachment bracket 3c disposed at the rear right side of the connector 8 when viewed from the left side of the connector 8 according to the embodiment. As shown in FIG. 8B, a contact portion 10 is provided at the connection portion 6 of the attachment bracket 3c in the vicinity of the center point of the fixing portion 5c. The contact portion is protruded from the lower portion of the connection portion 6 formed between the attachment bracket 3c and the housing main body and comes in contact with a support surface of the vehicle. In this embodiment, the contact surface of the contact portion 10 and the contact surface of the fixing portion 5c are flush with each other. With the contact portion 10, the ground surface which is in contact with the vehicle is expanded in the left-right direction. When the fixing portions 5a, 5b, and 5c of the attachment brackets 3a, 3b, and 3c provided at the three points of the housing 2 are screwed to a support surface of the vehicle body with the screw 12, the contact portion 10 comes into contact with the support surface of the vehicle. With the contact portion 10, an ground contact area of the airbag ECU 1 being grounded to the support surface of the vehicle is expanded. By forming the contact portion 10 within a right triangular region 7 defined by lines connecting the attachment center points of the fixing portions 5a, 5b, and 5c, a resonance frequency region can be moved to a high frequency region, and occurrence of resonance in a low frequency region can be suppressed.

In this embodiment, the right triangle is defined by the lines connecting the attachment center points of the fixing portions 5a, 5b, and 5c, but the invention is not limited to the right triangle. Although the housing 2 is fixed to the support surface at the three points of the fixing portions 5a, 5b, and 5c, the housing 2 may be fixed to the support surface at four or more fixing portions. The number of corners of a polygonal region defined by lines connecting the attachment center points of the fixing portions increases with an increase in the number of fixing portions.

Figure 9:
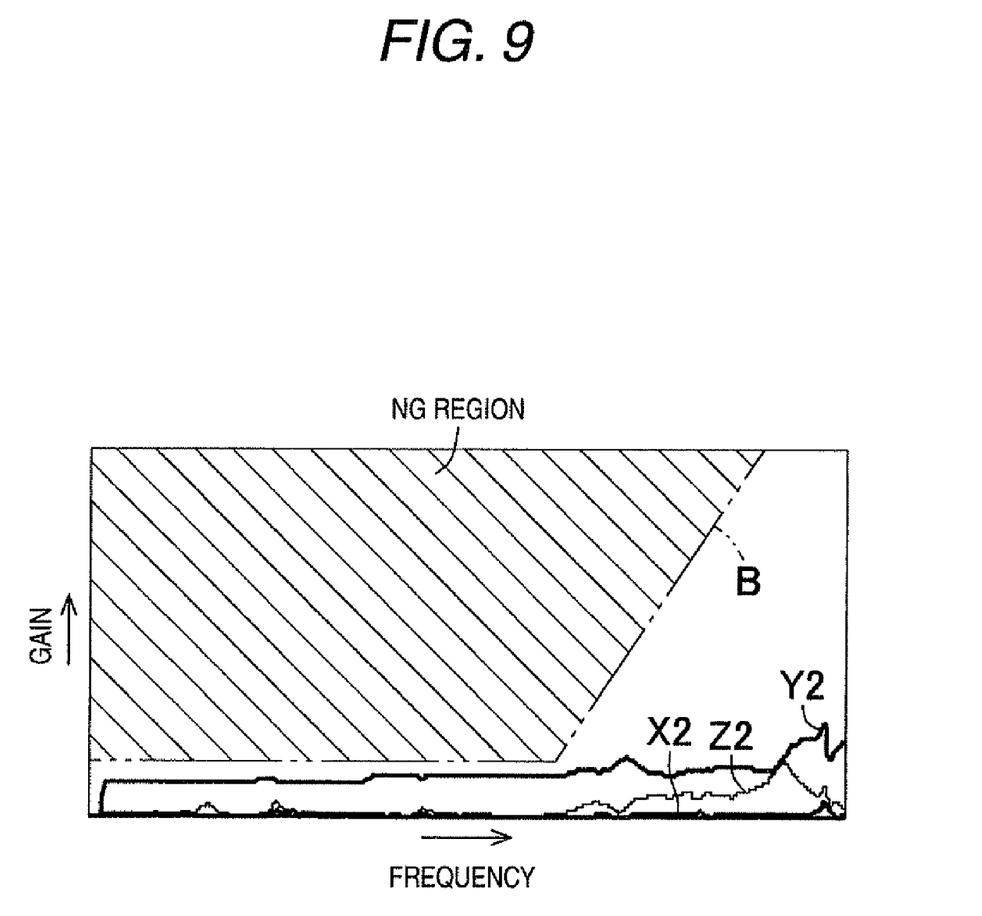
FIG. 9 is a graph illustrating a measurement result of the resonance characteristics of the airbag ECU 1 in a low frequency region according to the embodiment.

FIG. 9 is a graph illustrating a measurement result of the resonance characteristics of the airbag ECU 1 in a low frequency region according to the embodiment. Vibration is applied to the airbag ECU 1 in the front-back direction, the left-right direction, and the up-down direction of the vehicle, and the resonance generated in the respective directions are measured. X2 represents the resonance in the front-back direction (the traveling direction) of the vehicle, Y2 represents the resonance in the left-right direction of the vehicle, and Z2 represents the resonance in the up-down direction of the vehicle. A dashed-two dotted line B represents boundary of an NG region where it is determined the vehicle collision occurs. Despite that the connector 8 is the heaviest component mounted on the board 9, no attachment bracket is provided on the left side of the connector. Accordingly, the connector portion having the large degree of freedom is likely to swing greatly. If resonance is generated and enters the NG region, the acceleration sensor 11 may undesirably detect the impact that should not be detected.

Referring to the measurement result, no resonance which enters the NG region is observed. In comparison with the graph shown in FIG. 6, it can be seen that the contact portion 10 suppresses the occurrence of the resonance Y2 in the left-right direction of the vehicle. Although the housing 2 is molded by aluminum die casting in this embodiment, the housing 2 may be molded by material other than a metal, such as resin. Even when the housing 2 is molded by resin, the same effects can be obtained.

In the above embodiment, the contact portion 10 is provided at the connection portion 6 of the attachment bracket 3c, but the invention is not limited thereto. For example, the contact portion 10 may be provided at a connector cover portion (not shown), which surrounds the connector 8 of the housing 2, so as to come into contact with the support surface of the vehicle. In this case, the contact portion 10 is also formed within the right triangular region 7 defined by the lines connecting the attachment center points of the fixing portions 5*a*, 5*b*, and 5*c*. Thus, when the contact portion 10 is provided at the connector cover portion, a resonance frequency region can be moved to a high frequency region, and occurrence of resonance in a low frequency region where can be suppressed, similarly to the case where the contact portion 10 is provided at the connection portion 6 of the attachment bracket 3*c*. The contact portion 10 may be formed in one of the fixing portions 5*a*, 5*b* and 5*c*.

As described above, the housing fixing structure is configured to fix the housing 2 of the airbag ECU 1 to the support surface of the vehicle. The airbag ECU 1 is provided with the acceleration sensor 11 for detecting the impact of the vehicle collision and configured to control the airbag based on information detected by the acceleration sensor 11. The housing 2 includes the housing main body which accommodates the acceleration sensor 11 and the fixing portions 5*a*, 5*b*, and 5*c* which are configured to be fixed to the support surface provided in the vehicle. The housing 2 is provided with the contact portion 10 which is configured to come into contact with the support surface of the vehicle. And the contact portion 10 is disposed within the region defined by the lines connecting the center points of the fixing portions 5*a*, 5*b*, and 5*c*. Therefore, the safety control can be performed based on a signal of the sensor 11 for detecting the impact.

Further, the center point of the fixing portion 5*b* and the center point of the fixing portion 5*c* are arranged on the line in the longitudinal direction of the vehicle, and the center point of the fixing portion 5*b* and the center point of the fixing portion 5*a* are arranged on the line in the width direction of the vehicle. Therefore, the contact portion 10 is formed in the vicinity of the center point of the fixing portion 5*c* within the triangular region 7, and thus the resonance of the airbag ECU 1 in a region where it is determined that the vehicle has collided can be suppressed.

The contact portion 10 formed in the vicinity of the center point of the fixing portion 5*c*. Therefore, the resonance of the airbag ECU 1 in a region where it is determined that the vehicle has collided can be suppressed.

The connection portion 6 is formed so as to connect the fixing portion 5*c* to the housing main body, and the contact portion 10 is formed at the connection portion 6. Therefore, the contact portion 10 is formed in the vicinity of the center point of the fixing portion 5*c*, and thus the resonance of the airbag ECU 1 in a region where it is determined that the vehicle has collided can be suppressed.

The housing main body is provided with the accommodating portion accommodating the board 9 on which the connector 8 connecting the acceleration sensor 11 to an external electronic component. Therefore, the acceleration sensor 11 can detect the impact transferred to the board 9, the signal detected by the acceleration sensor 11 can be output to the airbag ECU 1, and the connector 8 can connect the acceleration sensor 11 and the external electronic component via the connection terminal.

The housing main body is provided with the connector cover portion which covers the connector 8, and the contact portion 10 may be formed at the connector cover portion. Therefore, the resonance of the airbag ECU 1 in a region where it is determined that the vehicle has collided can be suppressed.

The connector 8 is provided at the front side or the rear side of the housing 2 in the longitudinal direction of the vehicle. Therefore, the connector 8 can connect the acceleration sensor 11 to the external electronic component via the connection terminal.

The housing main body has a substantially quadrangular shape and the fixing portions are respectively disposed at three corners of the quadrangular shape of the housing main body. Therefore, when the impact is applied to the vehicle, the attachment bracket 3*c* at the rear portion of the housing 2 is broken, so the impact transferred to the board 9 is reduced.

The housing fixing structure is configured to fix the housing 2 of the ECU 1 to the support surface of the vehicle. The ECU 1 is equipped with the acceleration sensor 11 for detecting the impact applied to the vehicle and configured to perform a predetermined control based on information detected by the acceleration sensor 11. The housing 2 includes the housing main body which accommodates the acceleration sensor 11 and three or more fixing portions which are configured to fix the housing 2 to the support surface provided in the vehicle. A portion of the housing 2 is protruded within a polygonal region defined by the lines connecting the center points of the fixing portions. And the contact portion which is configured to come into contact with the support surface provided in the vehicle is formed around the location where the portion of the housing 2 protrudes within the polygonal region. Therefore, the safety control can be performed based on the signal from the sensor 11 for detecting the impact.

Although in this embodiment, the airbag ECU 1 to be mounted on the vehicle has been described, the invention is not limited thereto. For example, the invention may be applied to safety equipment which needs to operate at the time of the impact (the vehicle collision). For example, the invention may be applied to an ECU which controls the seatbelt retensioner. The housing 2 is not limited to being mounted on a vehicle, but it may be mounted on an aircraft, a ship, and the like.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. A housing fixing structure for fixing a housing of an airbag control device to a supporting portion of a vehicle, the airbag control device provided with an impact detection device and configured to control an airbag based on information detected by the impact detection device, the housing fixing structure comprising:
 the housing including three fixing portions which are configured to be fixed to the supporting portion; and
 a board fixed to the housing, the board on which the impact detection device and a connector for connecting the impact detection device to an external electronic component are mounted,
 wherein:
 the connector is provided such that at least a part of the connector is out of a triangular region which is defined by lines connecting center points of the fixing portions,
 the housing is provided with a contact portion, the contact portion projects from the housing to the supporting portion and is configured to come into contact with the supporting portion, and the contact portion is disposed within the triangular region and in the vicinity of one of the fixing portions, closest to the connector,
 the housing includes a connecting portion which connects the one of the fixing portions, closest to the connector, to a main body of the housing,
 a width of the connecting portion is formed narrower than that of the one of the fixing portions, and
 the contact portion projects from the connecting portion to the supporting portion.

2. The housing fixing structure as set forth in claim 1,
wherein the fixing portions includes a first fixing portion, a second fixing portion and a third fixing portion,
wherein the first fixing portion and the second fixing portion are disposed such that a center point of the first fixing portion and a center point of the second fixing portion are arranged on a line in a longitudinal direction of the vehicle, and
wherein the first fixing portion and the third fixing portion are disposed such that the center point of the first fixing portion and a center point of the third fixing portion are arranged on a line in a width direction of the vehicle.

3. The housing fixing structure as set forth in claim 2,
wherein the contact portion is disposed in the vicinity of the center point of the second fixing portion.

4. The housing fixing structure as set forth in claim 2,
wherein the housing further includes a connecting portion which connects the second fixing portion to a main body of the housing, and
wherein the contact portion is formed in the connecting portion.

5. The housing fixing structure as set forth in claim 1,
wherein the housing further includes an accommodating portion which accommodates the board.

6. The housing fixing structure as set forth in claim 5,
wherein the housing further includes a connector cover portion which covers the connector, and
wherein the contact portion is formed in the connector cover portion.

7. The housing fixing structure as set forth in claim 5,
wherein the connector is disposed at a front side or a rear side of the housing in a longitudinal direction of the vehicle.

8. The housing fixing structure as set forth in claim 5,
wherein the housing has a substantially quadrangular shape and the fixing portions are respectively disposed at three corners of the quadrangular shape.

9. The housing fixing structure as set forth in claim 1,
wherein the contact portion is formed in one of the fixing portions.

10. A housing fixing structure for fixing a housing of an airbag control device to a supporting portion of a vehicle, the airbag control device provided with an impact detection device and configured to control an airbag based on information detected by the impact detection device, the housing fixing structure comprising:
the housing including at least three fixing portions which are configured to be fixed to the supporting portion; and
a board fixed to the housing, the board on which the impact detection device and a connector for connecting the impact detection device to an external electronic component are mounted,
wherein:
the connector is provided such that at least a part of the connector is out of a polygonal region which is defined by lines connecting center points of the fixing portions,
the housing is provided with a contact portion, the contact portion projects from the housing to the supporting portion and is configured to come into contact with the supporting portion, and the contact portion is disposed within the polygonal region and in the vicinity of one of the fixing portions, closest to the connector,
the housing includes a connecting portion which connects the one of the fixing portions, closest to the connector, to a main body of the housing,
a width of the connecting portion is formed narrower than that of the one of the fixing portions, and
the contact portion projects from the connecting portion to the supporting portion.

11. The housing fixing structure as set forth in claim 1,
wherein the connecting portion of the housing is designed to be broken when an impact is applied to the vehicle due to a vehicle collision.

12. The housing fixing structure as set forth in claim 10,
wherein the connecting portion of the housing is designed to be broken when an impact is applied to the vehicle due to a vehicle collision.

* * * * *